(12) United States Patent
Chen

(10) Patent No.: US 10,568,301 B2
(45) Date of Patent: Feb. 25, 2020

(54) PET FEEDER

(71) Applicant: Tsung-Hsin Chen, Taipei (TW)

(72) Inventor: Tsung-Hsin Chen, Taipei (TW)

( * ) Notice: Subject to any disclaimer, the term of this patent is extended or adjusted under 35 U.S.C. 154(b) by 148 days.

(21) Appl. No.: 15/712,167

(22) Filed: Sep. 22, 2017

(65) Prior Publication Data

US 2018/0192614 A1     Jul. 12, 2018

(30) Foreign Application Priority Data

Jan. 6, 2017   (TW) .............................. 106200285 U

(51) Int. Cl.
  *A01K 5/02*     (2006.01)
  *A01K 5/01*     (2006.01)
  *A01K 29/00*    (2006.01)

(52) U.S. Cl.
  CPC .......... *A01K 5/0291* (2013.01); *A01K 5/0114* (2013.01); *A01K 29/005* (2013.01)

(58) Field of Classification Search
  CPC ...... A01K 29/00; A01K 29/005; A01K 29/02; A01K 29/0291; A01K 5/02; A01K 5/0291
  See application file for complete search history.

(56) References Cited

U.S. PATENT DOCUMENTS

| | | | | |
|---|---|---|---|---|
| 2,500,243 A | * | 3/1950 | Dixon ................... | A01K 5/0291 119/51.13 |
| 2,528,742 A | * | 11/1950 | Coffing ................. | A01K 5/0114 119/51.12 |
| 4,248,175 A | * | 2/1981 | Navarro ................ | A01K 5/0291 119/51.12 |
| 4,249,483 A | * | 2/1981 | Sobky .................. | A01K 5/0291 119/51.12 |
| 4,421,059 A | * | 12/1983 | Cousino ............... | A01K 5/0291 119/51.12 |
| 4,450,790 A | * | 5/1984 | Stansbury, Jr. ....... | A01K 5/0291 119/51.12 |
| 4,501,229 A | * | 2/1985 | Williamson .......... | A01K 5/0291 119/51.12 |

(Continued)

FOREIGN PATENT DOCUMENTS

| CA | 2754930 A1 | * | 5/2012 | ........... A01K 5/0114 |
|---|---|---|---|---|
| CN | 202588043 | * | 5/2012 | |

(Continued)

*Primary Examiner* — Monica L Williams
*Assistant Examiner* — Aaron M Rodziwicz
(74) *Attorney, Agent, or Firm* — Leong C. Lei

(57) ABSTRACT

The pet feeder includes a casing having an opening, a tray unit housed in the casing having a number of trays, a refrigerating unit inside the casing enclosing the tray unit so that all trays except one tray exposed by the opening are covered, a temperature control unit housed in the casing and connected to the refrigerating unit and the one tray exposed by the opening, and a driving unit connected to the temperature control unit and driving the tray unit to spin. Through the refrigerating unit and the temperature control unit, the trays are refrigerated whereas the one tray exposed is heated so that the pet may enjoy a warm meal. The driving unit automatically turns the tray unit so that one tray is exposed to feed the pet at scheduled times. The feeds remain fresh and the amount of feeds for each meal is also appropriately controlled.

7 Claims, 4 Drawing Sheets

(56) References Cited

U.S. PATENT DOCUMENTS

| | | | | |
|---|---|---|---|---|
| 4,617,874 A * | 10/1986 | Zammarano | A01K 5/0291 | 119/51.12 |
| 4,671,210 A * | 6/1987 | Robinson | A01K 5/0291 | 119/51.12 |
| 4,805,560 A * | 2/1989 | Knego | A01K 5/0291 | 119/51.12 |
| 4,981,106 A * | 1/1991 | Nagatomo | A01K 5/0275 | 119/51.11 |
| 5,150,664 A * | 9/1992 | Kirk | A01K 5/0291 | 119/51.12 |
| 5,377,620 A * | 1/1995 | Phillippi | A01K 5/0291 | 119/51.12 |
| 5,669,328 A * | 9/1997 | Lanfranchi | A01K 5/02 | 119/51.12 |
| 5,975,024 A * | 11/1999 | Sheaffer | A01K 1/031 | 119/464 |
| 6,349,671 B1 * | 2/2002 | Lewis | A01K 5/0291 | 119/51.02 |
| 7,650,855 B2 * | 1/2010 | Krishnamurthy | A01K 5/0291 | 119/51.11 |
| D676,619 S * | 2/2013 | Hansen | D30/121 | |
| D681,886 S * | 5/2013 | Paschall | D30/129 | |
| D700,407 S * | 2/2014 | Paschall | D30/129 | |
| 8,800,488 B2 * | 8/2014 | Stone | A01K 5/0114 | 119/51.01 |
| D773,127 S * | 11/2016 | Oates | D30/129 | |
| 2005/0066905 A1 * | 3/2005 | Morosin | A01K 5/0291 | 119/51.02 |
| 2006/0219187 A1 * | 10/2006 | Krishnamurthy | A01K 5/0275 | 119/719 |
| 2008/0289580 A1 * | 11/2008 | Krishnamurthy | A01K 5/0291 | 119/51.11 |
| 2012/0060761 A1 * | 3/2012 | Laro | A01K 5/02 | 119/51.11 |
| 2014/0090601 A1 * | 4/2014 | Stone | A01K 5/0114 | 119/51.01 |
| 2015/0342145 A1 * | 12/2015 | Christianson | A01K 15/021 | 119/51.11 |
| 2017/0238503 A1 * | 8/2017 | Deritis | A01K 5/0275 | |
| 2018/0199541 A1 * | 7/2018 | Huang | A01K 5/0114 | |

FOREIGN PATENT DOCUMENTS

| | | | | |
|---|---|---|---|---|
| DE | 202017106675 U1 * | 11/2017 | | A01K 5/0291 |
| WO | WO-2015166301 A1 * | 11/2015 | | A01K 5/0114 |

* cited by examiner

PET FEEDER

BACKGROUND OF THE INVENTION

(a) Technical Field of the Invention

The present invention generally relates to pet feeder, and more particularly to an automatic pet feeder capable of refrigerating and heating feeds.

(b) Description of the Prior Art

As pet owners have to go out for work or business and cannot care for their pets, pet owners usually stock feeds for multiple meals in the feeding bowls for the pets to consume.

If the pets fail to consume the stocked feeds entirely, the leftovers may attract vermin and become contaminated, or they may be rotten and deteriorated and become harmful to pets' health. Sometimes the pets may wolf down all feeds, which is also not healthy for the pets.

SUMMARY OF THE INVENTION

A major objective of the present invention is to provide a pet feeder that a driving unit automatically turns a tray unit so that one tray is exposed to feed the pet at scheduled times. Through its refrigerating unit and temperature control unit, feeds are refrigerated and the exposed tray is heated. The feeds therefore remain fresh and the amount of feeds for each meal is also appropriately controlled.

To achieve the objective, the pet feeder includes a casing having an opening, a tray unit housed in the casing having a number of trays, a refrigerating unit inside the casing enclosing the tray unit so that all trays except one tray exposed by the opening are covered, a temperature control unit housed in the casing and connected to the refrigerating unit and the one tray exposed by the opening, and a driving unit connected to the temperature control unit and driving the tray unit to spin.

In one embodiment, each tray is made of metallic material.

In one embodiment, the refrigerating unit is made of foam.

In one embodiment, the temperature control unit includes a thermoelectric cooling element and a cooling fan.

In one embodiment, the thermoelectric cooling element has a cooling terminal connected to the refrigerating unit and a heating terminal detachably connected to the one tray exposed by the opening.

In one embodiment, the driving unit is a motor.

In one embodiment, the pet feeder further includes a network camera configured on the top side of the casing and connected to the temperature control unit.

In one embodiment, the pet feeder further includes a communication unit and a storage unit, both connected to the network camera.

In one embodiment, the casing has a circular or polygonal shape.

In one embodiment, each tray has a circular or polygonal shape.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
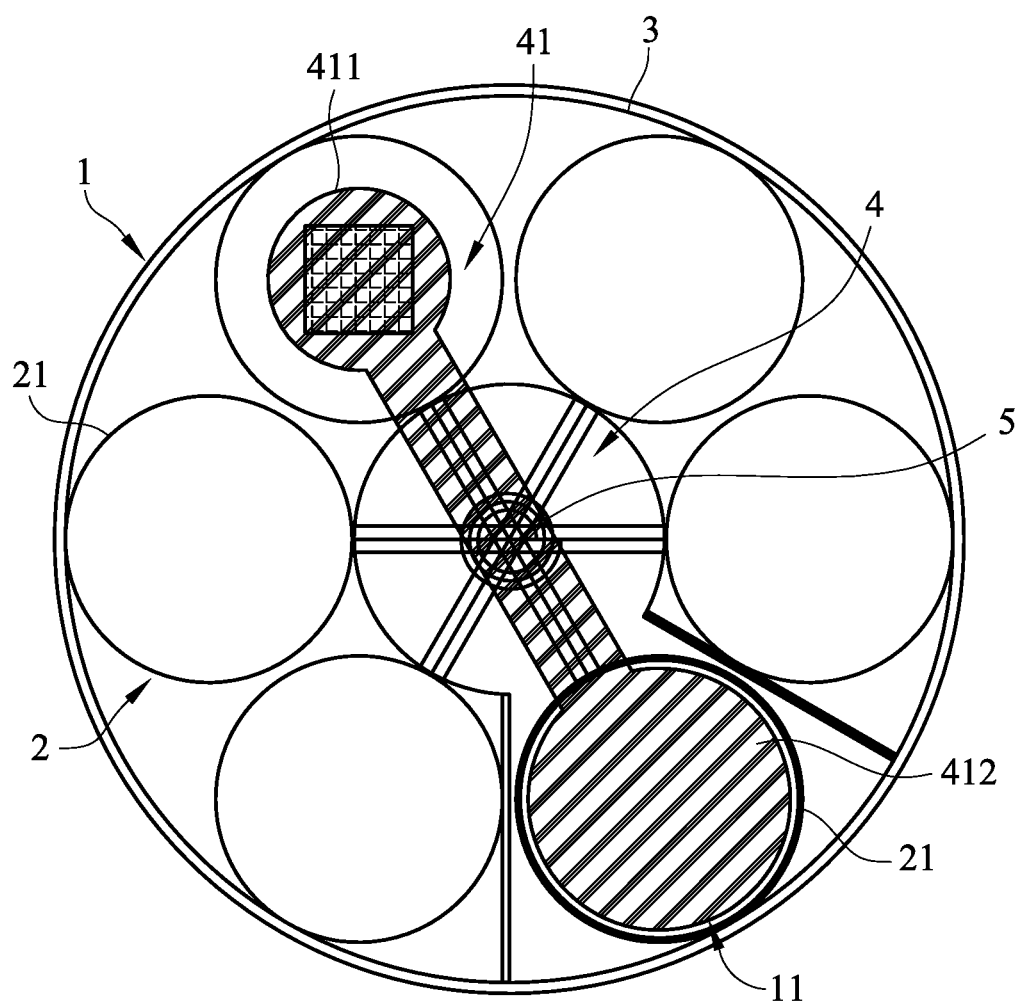
FIG. 1 is a top-view diagram showing a pet feeder according to a first embodiment of the present invention.
Figure 2:
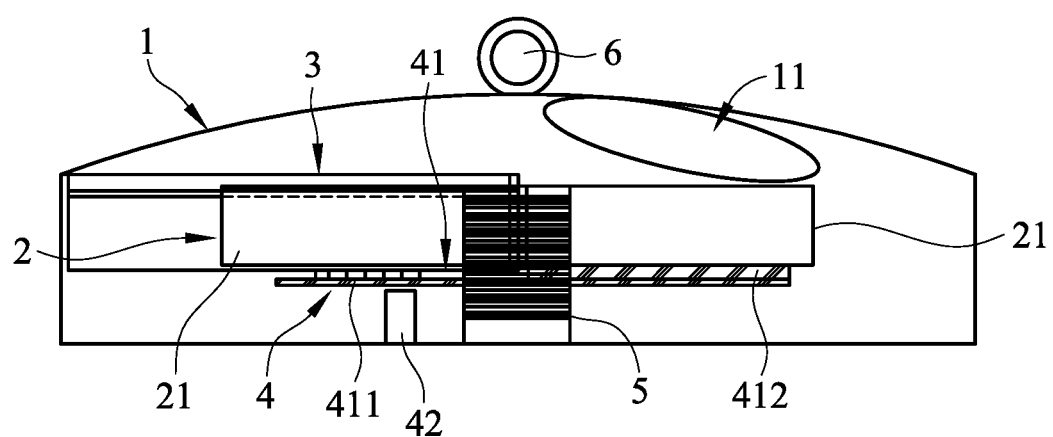
FIG. 2 is a schematic sectional diagram showing the pet feeder of FIG. 1.

As shown in the top and sectional views of FIGS. 1 and 2, a pet feeder according to a first embodiment of the present invention includes a casing 1, a tray unit 2, an refrigerating unit 3, a temperature control unit 4, and a driving unit 5.

The casing 1 has an opening 11, which is circular in shape in the present embodiment, on a top side for pets to access the feeds stored in the casing 1.

The tray unit 2 is housed in the casing 1 and includes a number of indented trays 21. Each tray 21 has an open top and is made of a metallic material. Each tray 21 has a shape comparable to that of the opening 11, and therefore is circular in the present embodiment.

The refrigerating unit 3 is housed in the casing 1 and encloses the tray unit 2 so that all trays 21 except the one exposed by the opening 11 are covered by the refrigerating unit 3, which is made of foam.

The temperature control unit 4 is also housed in the casing 1 and includes a thermoelectric cooling element 41 and a cooling fan 42. The thermoelectric cooling element 41 includes a cooling terminal 411 connected to the refrigerating unit 3 and heating terminal 412 detachably contacts with the tray 21 exposed by the opening 11.

The driving unit 5 drives the tray unit 2 to spin and is connected to the temperature control unit 4. The driving unit 5 may be a motor.

To utilize the pet feeder, a pet owner opens the casing 1 and fills each tray 21 of the tray unit 2 with an appropriate amount of feeds. The pet owner then closes the casing 1. The temperature control unit 4 is then configured with the cooling temperature, the heating temperature, and the operation schedule for the thermoelectric cooling element 41, the cooling fan 42, and the driving unit 5.

The thermoelectric cooling element 41's cooling terminal 411 provides a low temperature for the refrigerating unit 3 so that feeds may remain moist and fresh while they are preserved. At scheduled times, the driving unit 5 spins the tray unit 2 so that a tray 21 is moved beneath and exposed by the opening 11. The exposed tray 21 contacts with the heating terminal 412 so that the tray 21, along the feeds inside, is warmed up. A pet can access the warm feeds through the opening 11.

The pet feeder may further include a network camera 6 connected to the temperature control unit 4. The network camera 6 is configured on the top side of the casing 1 and is connected to a communication unit and a storage unit (both not shown). The pet owner then may utilize a network device such as a smart phone or a computer to link with the communication unit and monitor how the pet is fed visually or audibly. The storage unit may store the video and audio recordings. The pet owner may also configure and control the pet feeder through the smart phone APP. The pet owner may stop the pet feeder if the pet feed is knocked over. The communication unit may also automatically notify the pet owner when abnormality occurs, and the pet owner may conduct troubleshooting through the smart phone, computer, or related network device.

Figure 3:
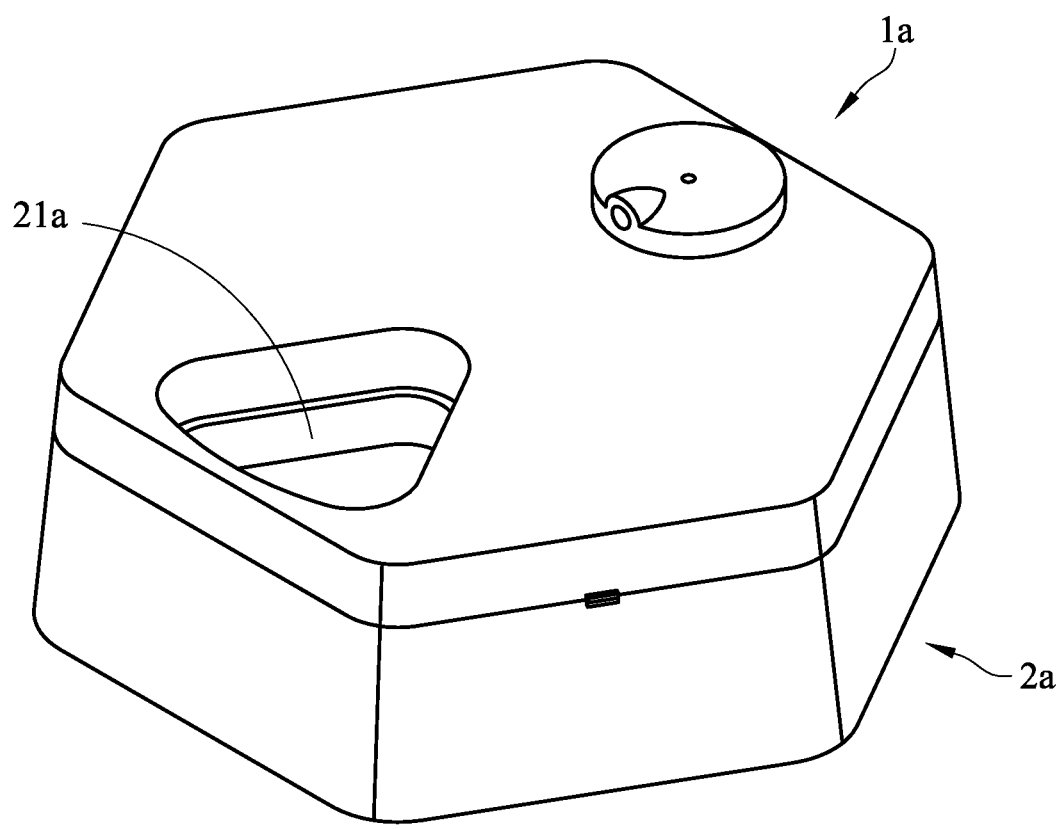
FIG. 3 is a perspective diagram showing a pet feeder according to a second embodiment of the present invention.
Figure 4:
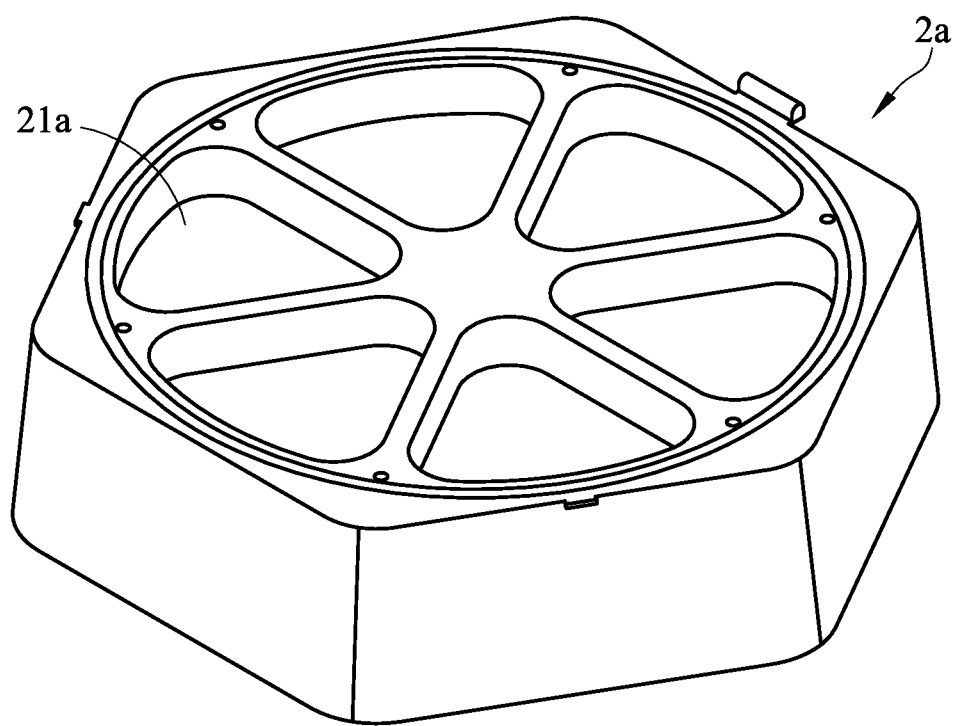
FIG. 4 is a perspective diagram showing a tray unit for the pet feeder of FIG. 3.

FIGS. 3 and 4 depict a pet feeder according to a second embodiment of the present invention. As illustrated, the casing 1*a* of the present embodiment has a polygonal shape. The trays 21*a* of the tray unit 2*a* are of a triangular shape and the opening of the casing 1*a* has a comparable shape.

As described above, the pet feeder according to the present invention resolves the drawbacks of the prior arts. Through the refrigerating unit and the temperature control unit, the trays are refrigerated so that the feeds remain fresh whereas the one tray exposed is heated so that the pet may enjoy a warm meal. The driving unit automatically turns the tray unit so that one tray, along with its stored feeds, is exposed to feed the pet at scheduled times. The amount of feeds for each meal is also appropriately controlled.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A pet feeder, comprising
 a casing having an opening on a top side;
 a tray unit housed in the casing comprising a plurality of trays made of metallic material;
 a refrigerating unit housed in the casing and enclosing the tray unit so that all trays except one tray exposed by the opening are covered;
 a temperature control unit housed in the casing; and
 a driving unit connected to the temperature control unit and driving the tray unit to spin;
 wherein the temperature control unit comprises a thermoelectric cooling element and a cooling fan;
 the thermoelectric cooling element has a cooling terminal connected to the refrigerating unit so that a low temperature is provided for the refrigerating unit;
 the thermoelectric cooling element further has a heating terminal;
 the driving unit spins the tray unit at scheduled times by the temperature control unit, so that a tray is moved beneath the opening, becomes the one tray exposed by the opening, and the one tray exposed by the opening is warmed up.

2. The pet feeder according to claim 1, wherein the refrigerating unit is made of foam.

3. The pet feeder according to claim 1, wherein the driving unit is a motor.

4. The pet feeder according to claim 1, further comprising a network camera configured on the top side of the casing and connected to the temperature control unit.

5. The pet feeder according to claim 4, further comprising a communication unit and a storage unit, both connected to the network camera.

6. The pet feeder according to claim 1, wherein the casing has a circular or polygonal shape.

7. The pet feeder according to claim 1, wherein each tray has a circular or polygonal shape.

* * * * *